UNITED STATES PATENT OFFICE.

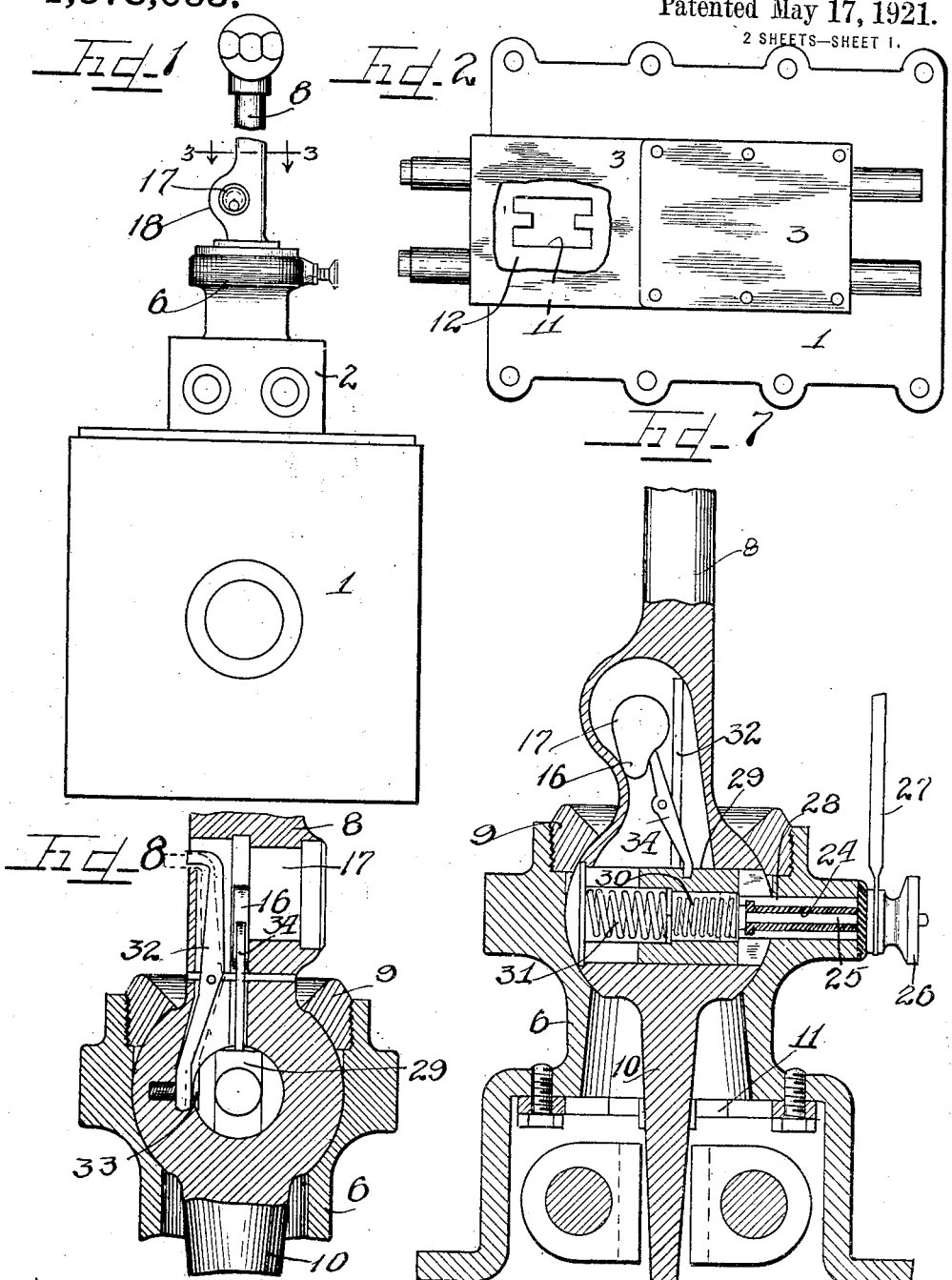

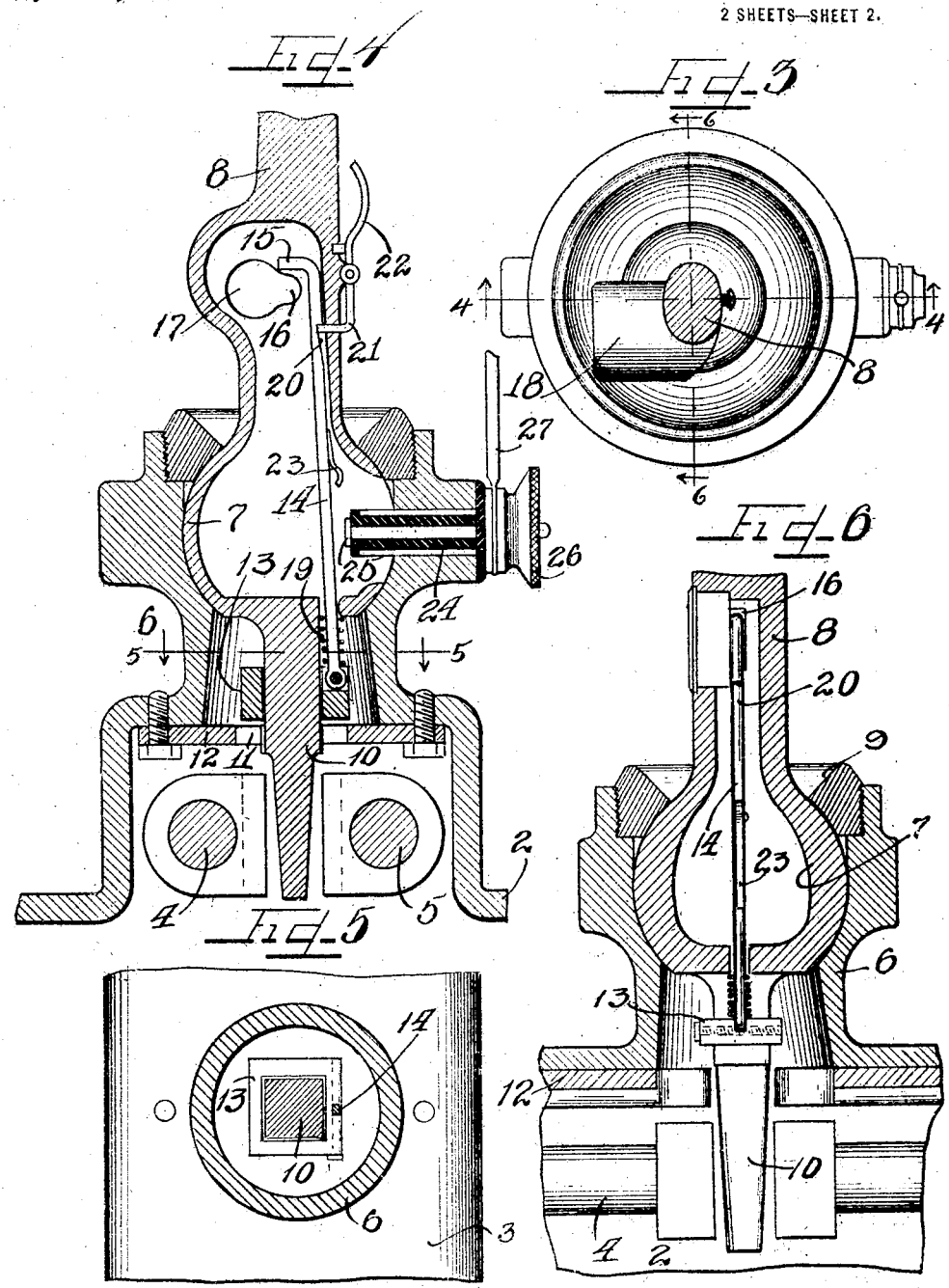

JOHN H. IMHOFF, OF CHICAGO, ILLINOIS, ASSIGNOR, BY MESNE ASSIGNMENTS, TO JOHNSON AUTOMOBILE LOCK CO., OF CHICAGO, ILLINOIS, A CORPORATION OF ILLINOIS.

GEAR-SHIFT AND IGNITION LOCK.

1,378,033.          Specification of Letters Patent.      Patented May 17, 1921.

Application filed February 21, 1916, Serial No. 79,642. Renewed September 18, 1917. Serial No. 192,034.

*To all whom it may concern:*

Be it known that I, JOHN H. IMHOFF, a citizen of the United States, and a resident of the city of Chicago, in the county of Cook and State of Illinois, have invented certain new and useful Improvements in a Gear-Shift and Ignition Lock; and I do hereby declare that the following is a full, clear, and exact description of the same, reference being had to the accompanying drawings, and to the numerals of reference marked thereon, which form a part of this specification.

This invention relates to a lock for the shift lever of a gear shift on a motor car or other mechanism. In most types of motor cars a ball and socket type of gear shift is used, and shifting of gears is accomplished by merely rocking the lever in its ball and socket connection. Owing to the simplicity of design of this type of construction, it has been difficult to apply a convenient external locking device thereto, for instance a padlock. Furthermore, the use of external locking devices on a gear shift lever is objectionable, owing to the accessibility of the lock for damage or destruction by persons unauthorized to use the car.

It is an object therefore of this invention to provide a self-contained locking device for a ball and socket type of gear shift requiring merely the insertion of a key into the connection to unlock the same, and with the mechanisms so constructed that by the simple release of a small lever for the purpose, the gear shift lever may be locked when desired without necessitating the use of the key.

It is also an object of this invention to provide a lock for the shift lever of a gear shift requiring only the insertion of a key into the universal joint connection of the lever to release the same when locked, the locking mechanism acting automatically without use of a key to lock the lever when so desired, and as well serving to ground the ignition system of the motor car, to thereby prevent operation of the engine.

It is also an object of this invention to provide a self-contained combination gear shift lever and ignition lock associated with the ball and socket connection of the gear shift lever of the gear shift on a motor car.

It is furthermore an object of this invention to provide a self-contained key-operated lock for a gear shift lever of a motor car gear shift wherein, with the lever moved into neutral position, the lock may be manually released without the use of a key to lock said lever, and only unlocked by insertion of a key to retract the locking mechanism and adjusting the same before withdrawal of the key to permit automatic latching thereof without the use of a key for the purpose.

It is finally an object of this invention to construct a lock for a gear shift lever and ignition system which is self-contained and concealed within the mechanisms of the lever and its mounting and which operates automatically to lock the lever when so desired in neutral position, and is only releasable by insertion and actuation of a key for the purpose.

The invention (in a preferred form) is illustrated in the drawings and hereinafter more fully described.

In the drawings:

Figure 1 is an elevational view partly broken away showing a gear shift and shift lever equipped with a lock embodying the principles of my invention.

Fig. 2 is a fragmentary top plan view of the gear shift with the shift lever and its connection to the gear set removed and broken away to show the interior of the upper portion of the gear shift mechanism.

Fig. 3 is a fragmentary sectional view taken on line 3—3 of Fig. 1, with parts omitted.

Fig. 4 is a detailed section taken on line 4—4 of Fig. 3, with parts omitted and parts shown in elevation.

Fig. 5 is a fragmentary detail section taken on line 5—5 of Fig. 4.

Fig. 6 is a detail sectional view taken on line 6—6 of Fig. 3, with parts omitted and parts shown in elevation.

Fig. 7 is a view similar to Fig. 4, of a modified form of device.

Fig. 8 is a view similar to Fig. 6, of the modified form of device.

As shown in the drawings:

The transmission case of the gear shift is denoted as a whole by the reference numeral 1, and formed on the cover thereof is a housing 2, provided with cover plates 3, and containing the slidable shift rods 4 and 5, by which movements of the gears within the transmission case 1, are effected. Formed integrally with the forward cover plate 3, and projecting upwardly therefrom is a hollow globular or socket receptacle casing 6. Seated movably within the socket casing member 6, is the rounded hollow ball end 7, of a gear shift lever 8, the same being retained in said socket member 6, by a collar 9, threaded into the upper end of said member 6. Below the globular or ball end 7, of the shifting lever, an integral downwardly projecting tail member 10, is provided, capable of being oscillated through an H-slot 11, in a plate 12, which is secured beneath the socket member 6, on the under side of the cover plate 3. The H-slot 11, represents the field of operation of the tail member 10, in its oscillating movement for co-action with the rods 4 and 5, to shift the transmission gears.

Slidably mounted upon the upper portion of the tail member 10, is a block 13, adapted to slide downwardly on said tail member, when in neutral position, into the H-slot 11, to thereby lock said tail member and consequently the entire gear shift lever 8, from movement. Pivoted in said sliding block 13, is a long upstanding latch lever, bar or rod 14, which extends upwardly into the hollow interior of the ball member 7, of the gear shift lever, and at its end is bent inwardly, as denoted by the reference numeral 15, to co-act with the rounded projection 16, formed on the rotatable barrel 17, of a pin lock which is mounted in a cylindrical extension 18, formed on the lever 8. Coiled around the lower end of said latch lever 14, is a spiral compression spring 19, the upper end of which bears beneath the ball portion 7, of the lever, and the lower end of which bears upon the block 13, acting normally to slide the same downwardly into engagement with the H-slot 11. This movement of the block 13, however, is prevented, due to the provision of a notch 20, in the upper end of the lever 14, into which the inturned toothed end 21, of a small spring impelled finger lever 22, projects, said finger lever being pivoted on the exterior of the gear shift lever 8, as clearly shown in Fig. 4.

Secured upon said latch lever 14, is a small resilient contact 23, adapted when said latch lever moves downwardly to ground the ignition system, as hereinafter described. Secured through one side of the socket casing 6, is an insulating bushing 24, within which is mounted a conductor 25, provided on its outer end with a terminal connection 26, which holds connected thereto a wire 27, from the undergrounded main line wire of the high tension circuit leading to the magneto of the motor car. The resilient contact member 23, is adapted to close against the conductor 25, to thereby ground the high tension ignition circuit of the car and thereby prevent operation of the motor.

In the modified form of my invention illustrated in Figs. 7 and 8, as before described, an insulating bushing 24, for a conductor 25, is mounted through one side of the socket casing 6, and within a cylinder 28. The lower ball end of the gear shift lever 8, is cored out on its interior, and transversely slidable therewithin is a locking block 29, having a cylindrical recess in one end thereof adapted to engage over the cylinder 28, at the same time closing the circuit through coiled springs 30 and 31, respectively, mounted on the interior of said block, with the terminal conductor 25. When the slidable block 29, is retracted against the compression of the springs 30 and 31, a spring impelled pivoted lever 32, mounted on the interior or cored out portion of the ball end of the lever 8, latches into engagement with a notch 33, provided in the side of the block 29, as shown in Fig. 8, to hold the same retracted until released by thrusting the upper end of said lever 32, from the dotted line position shown in Fig. 8, into the full line position. Also pivoted within the hollow interior of the ball end of the gear shift lever, is a retracting lever 34, the lower end of which is loosely engaged with a notch in the upper side of the block 29, and the upper end of which is adapted to co-act with and be shifted by the extension or projection 16, on the lock cylinder 17, of the lock. It is obvious that the locking block previously described could be utilized without the H-plate 12, and so constructed as to co-act with the abutments on the ends of the gear shift rods themselves.

The operation is as follows:

The neutral position of the gear shift lever 8, is that with the tail portion 10, thereof, projected vertically downward through the central portion of the H-slot 11. It is obvious that in order to shift gears a composite movement of the gear shift lever 8, is necessary, that is, the same must be thrown to one side and either forward or rearwardly for the purpose, and hence the mechanisms which will act to prevent movement in any one direction of the gear shift lever 8, in its ball and socket connection, when the same is in neutral position, will serve to lock the same to prevent shifting of the gears. This is accomplished effectually in the first instance described by sliding the block 13, downwardly on the tail portion 10, of the gear shift lever into the slot 11, thereby preventing movement of said gear shift lever in any direction from neutral position. With the parts shown in the position illustrated in Fig. 4, in order to lock the lever it is only necessary to thrust inwardly on the upper end of the small exterior lever 22, thereby releasing the end thereof from the notch 20, of the latch lever 14, and the spring 19, serves to impel the block 13, downwardly into the H-slot 11. Not only is the gear shift lever locked from movement, but the contact member 23, closing against the insulated conductor member 25, serves to ground the ignition system, so that the motor of the car cannot be operated. In unlocking the mechanism, the key is inserted into the lock and the cylinder 17, turned by means of the key upwardly into the position shown in Fig. 4, whereupon the toothed end 21, latches in the notch 20, of the lever 14, to hold the same elevated, and then the lock cylinder 17, is turned downwardly again so that the extension 16, thereon is out of the path of movement of the inwardly bent end 15, of the latch lever, so as not to impede downward movement thereof when the same is released. It is obvious, therefore, that an unlocking and locking operation of the car which is ordinarily two operations, is in the present invention only a single operation, that is, the locking of the car is entirely automatic after release by manual actuation of the small lever 22.

The operation of the form of device shown in Figs. 7 and 8, is identical, except that the mechanisms for performing the purpose are slightly different. In this instance the locking block 29, which is horizontally slidable, is held retracted against the compression of the springs 30 and 31, by a latch lever 32, which may be released by thrusting the upper end thereof inwardly into the full line position shown in Fig. 8, whereupon said locking block 29, engages over the end of the cylinder 28, thereby locking the ball end 7, of the gear shift lever 8, within the socket casing 6. Retraction of said locking slide block 29, is effected by inserting the key into the lock and rotating the cylinder 17, so that the projection 16, will actuate the retracting lever 34, to return the block to unlocked position, whereupon the same is engaged by the spring impelled latch lever 32, and so held. The movement of the block 29, over the end of the cylinder 28, serves further to ground the conductor 25, which leads to the ignition system of the motor, so that a gear lock as well as ignition lock is thus afforded.

I am aware that various details of construction may be varied through a wide range without departing from the principles of this invention, and I therefore do not purpose limiting the patent granted otherwise than necessitated by the prior art.

I claim as my invention:

1. In a device of the class described, a gear shift lever, a ball and socket connection therefor permitting universal movement thereof, means in said ball and socket connection for locking said gear shift lever from movement, a finger lever pivoted on the exterior of said gear shift lever and projecting therein to hold said locking means normally in released position, said finger lever manually releasable to permit said locking means to automatically lock said gear shift lever from movement, and key operated mechanism for returning said locking means to unlocked position to release the gear shift lever for movement.

2. In a locking device of the class described the combination with a gear lever, of locking means slidably mounted thereon below the point of pivotal connection thereof and projecting therein, stationary mechanism adapted to receive said locking means co-acting therewith when moved to lock said lever from movement, means pivotally mounted on the exterior of said lever and projecting therein to engage said locking means to hold the same in released position, said pivotally mounted means adapted to be manually released to permit said locking means to engage said mechanism to hold the lever locked from movement, and key operated mechanism for retracting said locking means to release position to unlock the lever.

3. In a device of the class described, a gear shift lever, locking mechanism thereon and projecting therein, and spring impelled means pivotally mounted on the exterior of said lever and projecting therein to engage said locking mechanism to hold the same normally in release position, said locking mechanism adapted to be moved into position to lock said lever from movement when said means is manually released.

4. In a locking device for a gear shift lever of the class described, the combination with a lever, and means therein and thereon locking the same from movement, of mechanism simultaneously closing an electric circuit through said lever, and key-operated means for releasing said mechanism to unlock the lever and break the electric circuit.

5. In a lock for a gear shift lever of the class described, the combination with means associated with the pivoted end of said lever acting automatically when released to lock said lever, of electrical contact members adapted to be grounded by movement of said means.

6. In a combination lever and ignition lock, locking mechanism to lock the lever from movement, means pivoted on said lever and projecting therein acting when released to permit said mechanism to move into locked position, and electrical contact members adapted to establish a closed circuit by movement of said locking mechanism.

7. In a locking device for a gear shift lever of the class described, the combination with a lever, of a tail integrally formed thereon below the pivot point thereof, and means on said tail and projecting into said lever near the pivot point thereof adapted to lock the lever from movement.

8. In a device of the class described, a gear shift lever, and means slidably mounted therein, and means actuated thereby mounted on said lever below the pivot point thereof for locking said lever from movement.

9. In a device of the class described, a gear shift lever, of locking means movably mounted therein and projecting therefrom, and means slidably mounted upon said lever below the point of pivotal connection and connected to said locking means adapted to be moved thereby into a position to lock said lever from movement.

10. In a device of the class described, a gear shift lever, locking means movably mounted therein and thereon, and manually releasable mechanism pivotally mounted on said lever and projecting therein to normally hold said locking means in release position.

11. In a device of the class described, a gear shift lever, spring controlled locking means slidably mounted thereon below the pivot point thereof adapted to lock said lever from movement, and a key operated lock mounted on said lever and projecting therein adapted to engage said locking means for retracting the same to release position to unlock the lever.

12. In a device of the class described, a gear shift lever, locking means within the pivoted end thereof, a tail member integrally formed on the lower end of said lever, a slotted plate through which said tail member projects, and means slidably mounted on said tail member and connected to said locking means to be moved thereby into a position to engage in said slotted plate to lock the lever from movement.

13. In a device of the class described, a gear shift lever, locking mechanism movably mounted therein and thereon, and means disposed below the pivot point of said gear shift lever adapted to be engaged by said locking mechanism to lock the gear shift lever from movement.

14. In a device of the class described, a gear shift lever, actuating means therein, locking means slidably mounted on said lever below the pivot point thereof connected with said actuating means, and means associated with said lever adapted to receive said locking means to hold the lever locked.

15. In a device of the class described, a gear shift lever, locking means slidably mounted on the lower end thereof below the point of pivotal connection, key operated means within the pivoted end of said lever connected with said locking means to move the same to release position, and means adapted to receive said locking means to hold the lever locked against movement when said key operated means is released.

16. A lever locking device comprising a housing having a socket therein, a chambered ball movably mounted in said socket, a chambered lever arm integral with said ball and extending upwardly above said housing, the chambers in said ball and lever arm communicating with one another, a tail integrally formed on said ball and projecting downwardly into said housing, a latch bar in said chambers with the lower end thereof projecting into said housing, a locking block on said tail within said housing and connected with the lower projecting end of said latch bar, means in said housing to receive said locking block to hold the lever arm locked against movement, and key operated means in said lever arm connected with said latch bar to permit retraction of the locking block to unlock the lever arm.

17. A lever locking device comprising a housing, a lever supported by the housing with the lower end of the lever projecting into the housing and the upper end projecting upwardly above the housing, a latch bar completely inclosed by said lever and by said housing to make the latch bar inaccessible, a locking member connected with the latch bar inclosed by said housing and engaged on the lower end of said lever, and means operable from the exterior of the upper end of the lever adapted to actuate the latch bar and said locking member.

18. A lever locking device comprising a housing, a ball lever adjustably supported thereby with the upper end of the lever projecting above the housing and the lower end of said lever projecting into and inclosed by the housing, a locking member inclosed by said housing and slidably engaged on the lower end of the lever below the ball portion thereof, means within the housing for receiving said locking member to hold the lever locked against movement, a connecting bar inclosed within said lever and projecting out of said lever at a point within the housing to connect up with said locking member, and a key controlled lock recessed in the upper part of the lever and connected with said inclosed connecting bar to permit operation of the locking member.

In testimony whereof I have hereunto subscribed my name in the presence of two subscribing witnesses.

JOHN H. IMHOFF.

Witnesses:
EARL M. HARDINE,
GEORGE R. MOORE.